United States Patent [19]

Kashida et al.

[11] Patent Number: 4,996,607
[45] Date of Patent: Feb. 26, 1991

[54] AUDIO SIGNAL RECORDING APPARATUS

[75] Inventors: Motokazu Kashida, Tokyo; Toshiyuki Masui, Kanagawa; Tsutomu Fukatsu, Kanagawa; Masahiro Takei, Kanagawa; Kouji Takahashi, Kanagawa; Tomohiko Sasatani, Kanagawa, all of Japan

[73] Assignee: Canon Kabushiki Kaisha, Tokyo, Japan

[21] Appl. No.: 392,476

[22] Filed: Aug. 11, 1989

Related U.S. Application Data

[63] Continuation of Ser. No. 816,425, Jan. 6, 1986, abandoned.

[30] Foreign Application Priority Data

Jan. 17, 1985 [JP] Japan .................................. 60-6281
Jan. 18, 1985 [JP] Japan .................................. 60-7119
Jan. 19, 1985 [JP] Japan .................................. 60-7696

[51] Int. Cl.$^5$ .................. G11B 20/10; G11B 27/19
[52] U.S. Cl. .................................. 360/18; 360/32; 360/74.4; 360/72.2; 369/47
[58] Field of Search .................. 360/8, 9.1–10.3, 360/14.1, 18, 19.1, 20, 22, 23, 27, 29, 32, 71, 72.1, 72.2, 38.1, 74.1, 74.4, 77.14, 77.15, 73.12; 369/28, 32, 33, 47, 48, 50

[56] References Cited

U.S. PATENT DOCUMENTS 4,558,378 12/1985 Shibata et al. .................. 360/19.1
4,816,940 3/1989 Nagasawa et al. .................. 360/77.15

FOREIGN PATENT DOCUMENTS 60-1654 1/1985 Japan .................................. 360/72.2

Primary Examiner—Aristotelis M. Psitos
Assistant Examiner—Steven R. Garland
Attorney, Agent, or Firm—Robin, Blecker, Daley & Driscoll

[57] ABSTRACT

An audio signal recording apparatus comprises a detector for detecting a silent part of an incoming audio signal within the audio signal corresponding to less than a threshold value and generating a detection signal, a circuit for generating a reference signal of a predetermined frequency, a modulator for modulating the incoming audio signal to produce a modulated audio signal, a circuit for superimposing the reference signal on the modulated audio signal in response to the detection signal to produce a recording signal, and a recording circuit for recording the recording signal on a record bearing medium.

8 Claims, 14 Drawing Sheets

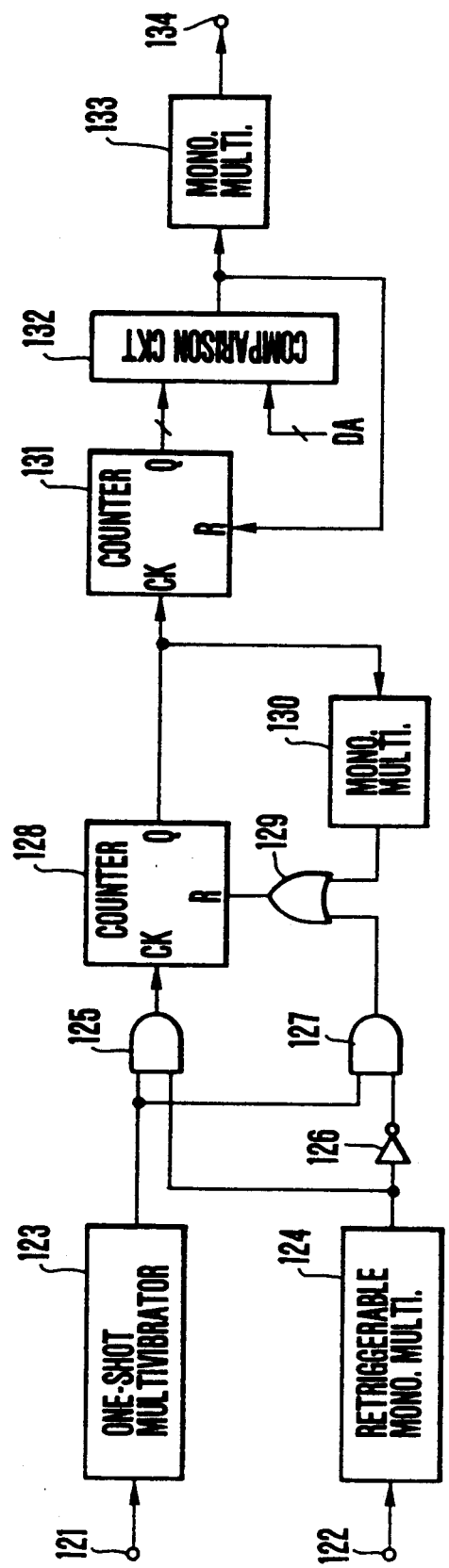
F I G. 7

AUDIO SIGNAL RECORDING APPARATUS

This application is a continuation, of application Ser. No. 816,425, filed Jan. 6, 1986 now abandoned.

BACKGROUND OF THE INVENTION

1. Field of the Invention

This invention in general relates to an audio signal recording apparatus, and more particularly to an audio signal recording apparatus provided with the function of searching out a recorded audio signal.

2. Description of the Prior Art

It has been practice to add search functions of varied kinds to audio signal recording apparatuses. Among these search functions, the function of searching out a joint in an audio signal (hereinafter referred to as the head search function) is considered indispensable to a recording apparatus of the kind arranged to be capable of recording audio signals over a long period of time and/or recording an audio signal of a high sound quality.

In accordance with the method conventionally employed for performing the head search function in an audio tape recorder, the tape is allowed to travel at a speed several to several tens of times as fast as the travelling speed employed in recording and then a mute or silent part of the signal thus reproduced with no sound is detected.

Meanwhile, as a result of the recent tendency of having audio signals of high sound quality, there have been proposed various audio signal recording methods using rotary heads. For example, to obtain an audio signal with high fidelity in a video tape recorder, the audio signal is recorded with frequency modulation by a rotary head. In the case of a tape recorder adapted exclusively for audio signals, it is known to record an audio signal with digital modulation by a rotary head. Further, some known audio recorders are arranged to perform digital modulation recording by time-base compressing an audio signal.

Briefly described, an example of the conventional audio tape recorders of the kind performing digital modulation recording by time-base compressing an audio signal is arranged as follows: FIG. 1 of the accompanying drawings shows by way of example the tape transport system employed in the audio tape recorder of the above-stated kind. The illustration includes a magnetic tape 1; a rotary cylinder 2 which carries a pair of rotary heads 3 and 4. The heads 3 and 4 are thus arranged to obliquely trace the surface of the tape 1 in recording an audio signal on the tape. An audio signal tape recorder capable of exclusively recording audio signals in a total of six channels can be obtained by arranging it to record a time-base compressed audio signal in each of six areas formed on the tape 1 in the longitudinal direction thereof every time these heads 3 and 4 rotate 36 degrees.

The following briefly describes this tape recorder

FIG. 1 shows the tape transport system of the above-stated tape recorder. FIG. 2 shows recording tracks formed on a tape by this tape recorder. While the head 3 or 4 traces distances from a point A to a point B, from the point B to a point C, from the point C to a point D, from the point D to a point E, from the point E to a point F and from the point F to another point G, audio signals can be recorded in areas CH1 to CH6. These areas CH1 to CH6 thus can be used for recording different audio signals therein respectively. An operation called azimuth-overwrite is performed on these areas. However, the tracks of these areas CH1–CH6 do not have to be on the same straight line. Each of the areas CH1–CH6 has one pilot signal recorded therein for tracking control. Different pilot signals are thus recorded in different areas in the order of rotation f1→f2→f3→f4. However, there is no correlation between them.

Referring further to FIG. 1, recording or reproduction is carried out in or from these areas CH1 to CH3 while the tape 1 is travelling at a predetermined speed in the direction of arrow 7 and in or from the areas CH4 to CH6 while the tape is travelling in the direction of arrow 9. Therefore, as shown in FIG. 2, the inclination of the areas CH1 to CH3 somewhat differs from that of the areas CH4 to CH6. With regard to a difference in the relative speed of the tape and the head for these groups of areas, a difference arising from the travel of the tape 1 is extremely small as compared with a difference arising from the rotation of the heads 3 and 4. Therefore, the difference in the relative speed presents no problem.

FIGS. 3(a) to 3(j) show in a time chart the recording or reproducing operation of the tape recorder which is arranged as described above. A phase detection pulse (hereinafter referred to as a PG signal) which is generated in synchronism with the rotation of the cylinder 2 as shown at FIG. 3(a). The PG signal is of a rectangular wave of 30 Hz repeating a high level (hereinafter referred to as an H level) and a low level (hereinafter referred to as an L level) alternately with each other at intervals of 1/60 sec. Another PG signal which is of the opposite polarity to the PG signal of FIG. 3(a) is shown in FIG. 3(b). The first PG signal is at an H level while the head 3 is rotating from the point B to the point G of FIG. 1. The other PG signal shown in FIG. 3(b) is at an H level while the other head 4 is rotating from the point B to the point G.

Pulses for reading data are obtained from the PG signal of FIG. 3(a) as shown in FIG. 3(c). The data reading pulses are used for sampling the audio signal of a period corresponding to one field (1/60 sec). FIG. 3(d) shows by H level parts thereof periods provided for signal processing on the one field portion of the sampled audio data by adding an error correcting redundant code or by changing the arrangement thereof by means of a RAM or the like. FIG. 3(e) shows a signal indicating data recording periods at H level parts thereof which represent timing for recording, on the tape 1, the recording data obtained through the signal processing operation mentioned above.

Referring to FIGS. 3(a) to 3(j), the temporal flow of signals is, for example, as follows: The data sampled during a period from a point of time t1 to a point of time t3, i.e. while the head 3 is moving from the point B to the point G, is subjected to a signal processing operation during a period from the point of time t3 to a point of time t5, i.e. while the head 3 is moving from the point G to the point A and are then recorded during a period from the point of time t5 to a point of time t6, or while the head 3 is moving from the point A to the point B. In other words, the data is recorded by the head 3 in the area CH1 as shown in FIG. 2. Meanwhile, the data which is sampled while the PG signal of FIG. 3(b) is at an H level is also processed at a similar timing before it is recorded in the area CH1 by the head 4.

FIG. 3(f) shows another PG signal which is obtained by shifting the phase of the PG signal of FIG. 3(a) to a predetermined degree, which corresponds to one area and is 36 degrees in this specific instance.

An audio signal recording operation using the PG signal of FIG. 3(f) and a PG signal which is not shown but is of an opposite polarity to the former is performed in the following manner: The data which is sampled during a period between the points of time t2 and t4 is subjected to a signal processing operation during a period between the points of time t4 and t6 in accordance with the signal of FIG. 3(g) and is recorded during a period between the points of time t6 and t7 in accordance with the signal of FIG. 3(h). In other words, the data is recorded in the area CH2 of FIG. 2 while the head is moving from the point B to the point C. Meanwhile, another data which is sampled during the points of time t4 and t7 is likewise recorded in the area CH2 by means of the other head during a period between the points of time t4 and t7.

The signal which is recorded in the area CH2 in the manner as described above is reproduced in the following manner:

The head 3 reads the data from the tape 1 in accordance with a signal shown in FIG. 3(h) during the period between the points of time t6 and t7 (and also during the period between the point of time t1 and t2). Then, during the period between the points of time t7 and t8 also (between t2 and t3), the reproduced signal is subjected to a signal processing operation which is carried out, in a manner reverse to the signal processing operation performed for recording, in accordance with a signal shown in FIG. 3(i). In other words, error correction and other processes are carried out during this period. Then, during a period between points of time t8 and t9, the reproduced audio signal which has been thus processed is produced in accordance with a signal shown in FIG. 3(j). The reproducing operation of the head 4 is of course performed with a phase difference of 180 degreees from the above-stated reproduction by the head 3, so that a continuous reproduced audio signal can be obtained.

For other areas CH3 to CH6, it goes without saying that the recording and reproducing operations are performed on the basis of the PG signal of FIG. 3(a) by phase shifting it as much as n×36 degrees. This is independent of the travelling direction of the tape.

It has thus become possible to obtain an audio-dedicated apparatus capable of recording audio signals over a long period of time in many channels. Assuming that recording lasts 90 min. for each of the areas, the audio tape recorder of this type is capable of recording a total of nine hours. Meanwhile, however, it is difficult to quickly find out what is recorded where. In other words, in searching a desired part of the record with the record bearing medium or tape allowed to travel at a high speed, the head is incapable of accurately tracing the recording tracks formed on the tape. Then, a reproduced audio signal cannot be obtained from the PCM audio signal. A lowered reproduction level of the audio signal makes it hardly possible to detect a part having no audio information, i.e. a mute part. With respect to the mute part, the record includes a PCM audio signal corresponding to information on the mute part. Therefore, it is also impossible to detect the mute part by detecting the presence or absence of a recorded signal.

SUMMARY OF THE INVENTION

It is a general object of the present invention to solve the above-stated problem of the prior art.

It is a more specific object of this invention to provide an audio signal recording apparatus which is capable of searching out a joint in audio information in whatever manner an audio signal may be modulated for recording.

Under this object, an audio signal recording apparatus arranged according to this invention as an embodiment thereof comprises: detecting means for detecting a silent period of an input audio signal having a small amount of audio information within the audio signal; first data generating means for generating a first data on the basis of the audio signal; second data generating means for generating a second data on the basis of the output of the detecting means; modulating means for modulating a data sequence consisting of the first and second data; and recording means for recording the output of the modulating means on a record bearing medium.

It is another object of this invention to provide an audio signal recording apparatus which is capable of accurately searching out solely a joint in an audio signal.

It is a further object of this invention to provide an audio signal recording apparatus capable of searching out a part of an audio signal in the neighborhood of the leader portion of the audio signal.

Under this object, an audio signal recording apparatus arranged according to this invention as another embodiment thereof comprises: first detecting means for detecting a silent period of an input audio signal having a small amount of audio information within the audio signal; second detecting means for detecting that the silent period continues over a first predetermined period of time; designating means for designating either a period from a point of time at which detection is made by the second detecting means to the end of the silent period or another period from the detection time point to the end of a second predetermined period whichever is shorter between the two periods; and recording means for recording along with the audio signal mark an information signal on a record bearing medium according to the output of the designating means.

It is a still further object of this invention to provide an audio signal recording apparatus which is capable of bringing a record bearing medium to a stop at such a point that permits either recording or reproduction beginning from a joint part of an audio signal.

Under that object, an audio signal recording apparatus arranged according to this invention as a further embodiment thereof comprises: first detecting means for detecting a silent period of an input audio signal having a small amount of audio information within the audio signal; second detecting means for detecting that the silent period continues over a predetermined period of time; mark information generating means for generating mark information in response to said second detecting means; moving means for moving the record bearing medium; recording means for recording, along with the audio signal, the mark information on the record bearing medium while causing the moving means to move the medium in a first direction at a first travelling speed; and moving action stopping means for bringing the moving action of the moving means on the medium according to the mark information recorded on the medium, the stopping means being arranged to bring the moving action of the moving means to a stop when the moving means is moving the medium in a second direction which is reverse to the first direction.

These and further objects and features of this invention will become apparent from the following detailed description of embodiments thereof taken in connection with the accompanying drawings.

BRIEF DESCRIPTION OF THE DRAWINGS

FIG. 7 is a diagram showing by way of example a head search detection circuit which is included in the same embodiment shown in FIG. 4.

DETAILED DESCRIPTION OF THE PREFERRED EMBODIMENTS

Figure 1:
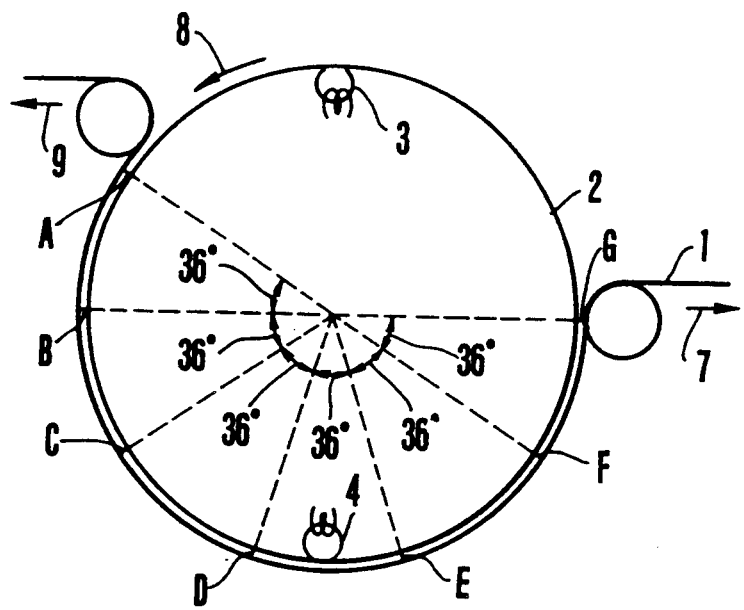
FIG. 1 is an illustration of the tape transport system of the conventional tape recorder.
Figure 2:
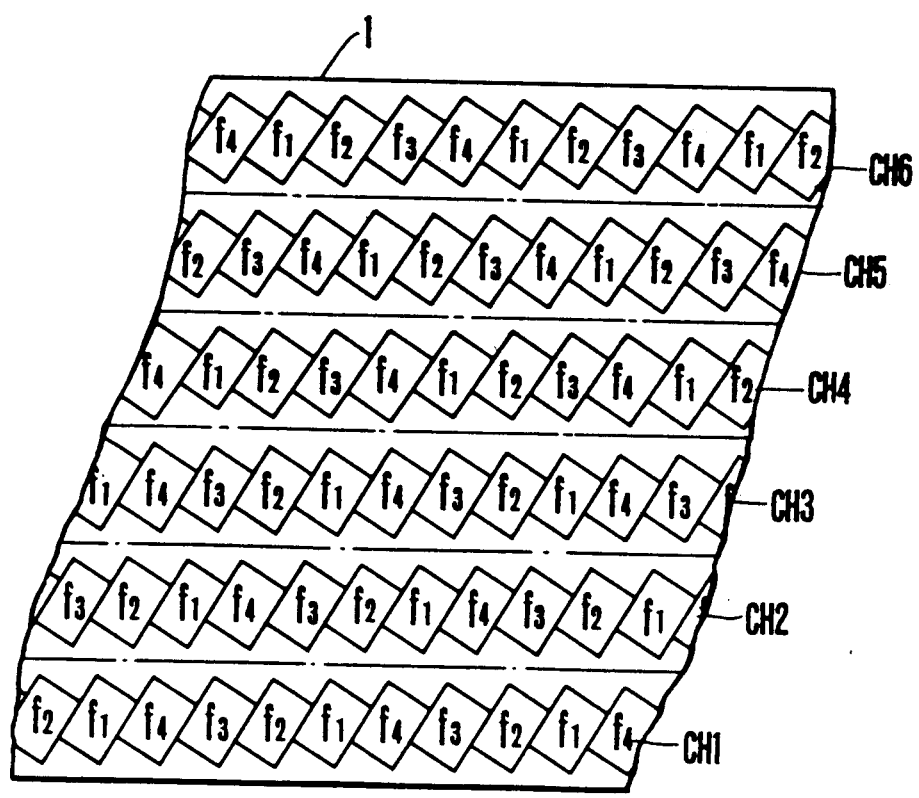
FIG. 2 is an illustration of the recording format of the recorder of FIG. 1.
Figure 3:
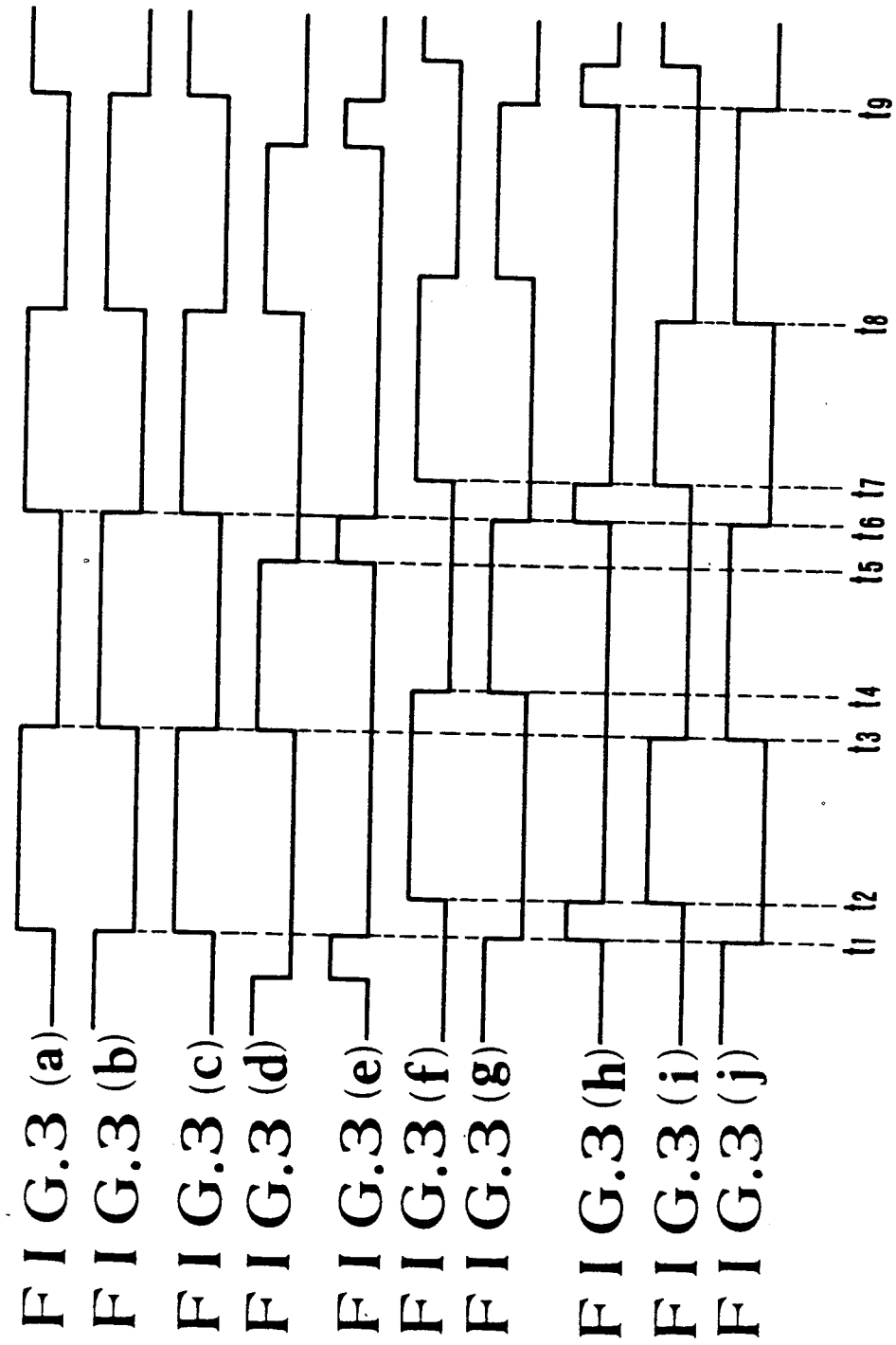
FIGS. 3(a) to 3(j) show in a timing chart the recording and reproducing timing of the conventional tape recorder shown in FIG. 1.
Figure 4:
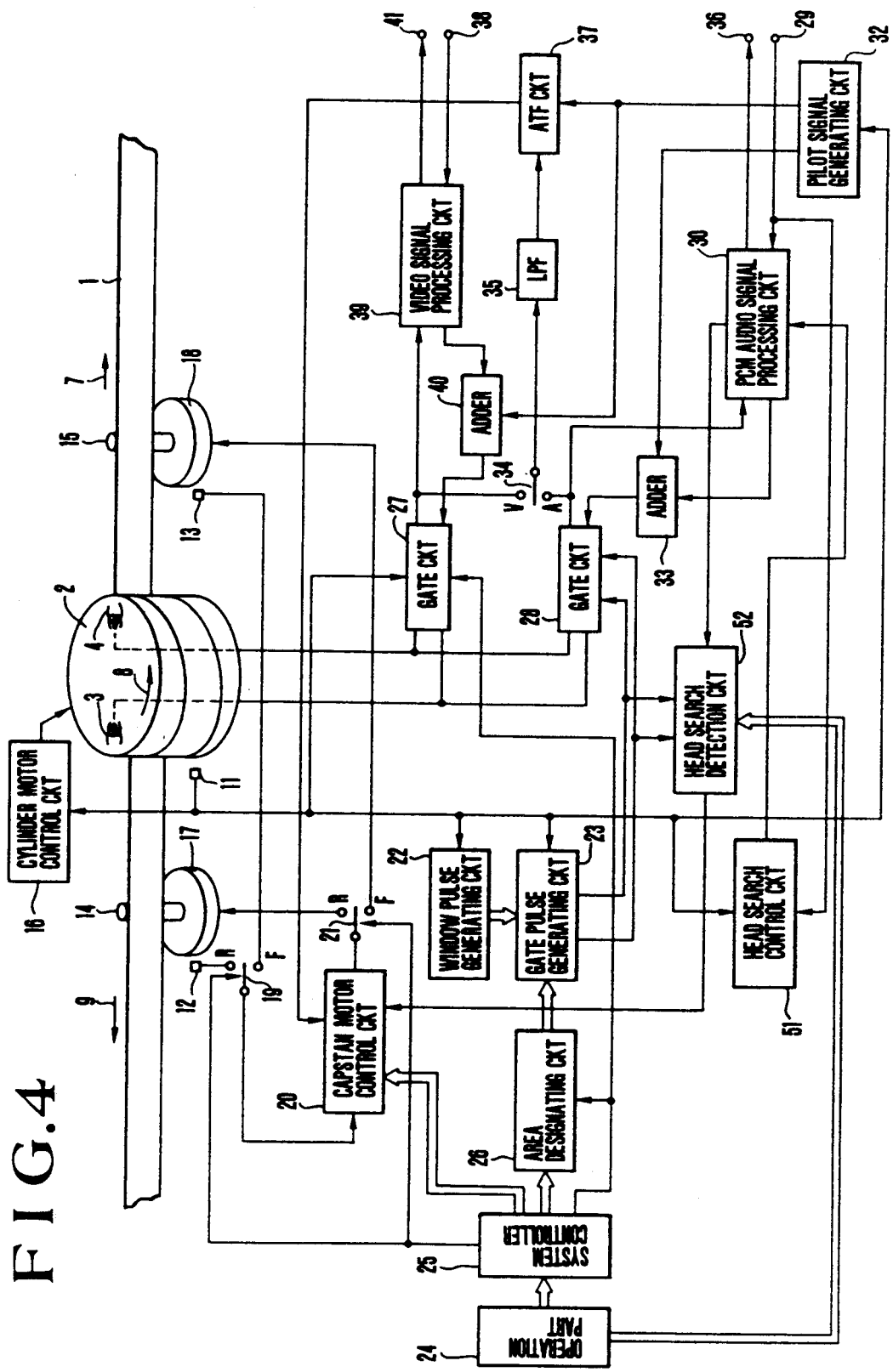
FIG. 4 is a diagram showing the outline of a tape recorder arranged according to this invention as an embodiment thereof.

The details of this invention will be understood from the following description of preferred embodiments thereof: FIG. 4 shows in outline the arrangement of a tape recorder made according to this invention as an embodiment thereof. In FIG. 4, the component elements which are similar to corresponding ones shown in FIG. 1 and FIG. 2 are indicated by the same reference numerals respectively. A PG signal which is obtained from the rotation detector 11 representing the rotation of the rotary cylinder 2 is supplied to a cylinder motor control circuit 16. The circuit 16 then causes the cylinder 2 to be rotated at a predetermined speed and at a predetermined rotation phase. Rotation detectors 12 and 13 are arranged to detect the rotation of the flywheels 17 and 18 of capstans 14 and 15. The outputs (hereinafter referred to as FG signals) of these rotation detectors 12 and 13 are supplied to a switch 19. The switch 19 selectively supplies one of them to a capstan motor control circuit 20. In recording, the output of the circuit 20 is supplied to one of capstan motors via a switch 21 in such a manner as to cause the capstan 14 or 15 to rotate at a predetermined speed. These switches 19 and 21 are in connection with their terminals F respectively for allowing the tape 1 to travel in the direction of arrow 7 (in the forward direction). They are in connection with other terminals R in allowing the tape 1 to travel in the direction of arrow 9 (in the reverse direction) respectively. The above-stated PG signal is supplied also to a window pulse generating circuit 22 and a gate pulse generating circuit 23.

An operation part 24 is arranged to permit selection of a recording reproduction or other operation mode and designation of a recording or reproducing area on the tape by a manual operation thereon. The operation part 24 also permits selection between the use of the tape recorder exclusively for recording audio signals and the use of it also for recording video signals.

The data which are thus obtained are supplied to a system controller 25. The system controller 25 controls the capstan motor control circuit 20, the switches 19 and 21, an area designating circuit 26, a gate circuit 27, etc. The area designating circuit 26 is arranged to supply an area designating data to the gate pulse generating circuit 23. The circuit 23 then produces a desired gate pulse. In case where a video signal is to be also recorded, the area CH1 is naturally designated. With regard to the gate pulse controlling a gate circuit 28, the gate pulse generating circuit 23 selectively supplies, according to the area designating data, the gate circuit 28 with one of the window pulses generated by the window pulse generating circuit 22 for each of the heads 3 and 4.

In recording, an analog audio signal coming via a terminal 29 is supplied to a PCM audio signal processing circuit 30. The audio signal is then sampled at the timing relative to the window pulse mentioned in the foregoing. A digital data is thus obtained and is further subjected to a signal processing operation which is performed in a manner as mentioned in the foregoing. The recording audio data which is thus obtained is supplied to an adder 33. The adder 33 adds tracking pilot signals of frequency values f1, f2, f3 and f4 generated in rotation by a pilot signal generating circuit 32 in the sequence of f1→f2→f3→f4 and other pilot signals which will be described later to the audio data. The output of the adder 33 is suitably gated by the gate circuit 28 as mentioned in the foregoing to be written into a desired area by means of the heads 3 and 4.

In reproducing, signals reproduced by the heads 3 and 4 are extracted by the gate circuit 28 also according to the window pulses. The reproduced signal which is thus obtained is supplied via a terminal A of a switch 34 to a low-pass filter (LPF) 35 and is also supplied to a PCM audio signal processing circuit 30. The PCM audio signal processing circuit 30 performs a signal processing operation on the signal, including error correction, time-base expansion, digital-to-analog conversion, etc. in a manner converse to the operation performed in recording. The reproduced analog audio signal which is thus processed is then produced from a terminal 36.

The LPF 35 separates the above-stated tracking pilot signals and supplies them to an ATF circuit 37. The ATF circuit 37 is arranged to produce a tracking error signal operating in accordance with the known four frequency method, wherein the reproduced tracking pilot signals are used in combination with other pilot signals which are generated by the pilot signal generating circuit 32 in the same sequence of rotation as in the case of recording. In case that the tape recorder is used exclusively for audio signals, the tracking error signal is obtained for every area to be sampled and held. The tracking error signal thus obtained is supplied to the capstan motor control circuit 20. The circuit 20 controls the reproduction travelling speed of the tape 1 through the capstans 14 and 15.

Recording and reproducing operations on a video signal are as described below

When the system controller 25 issues a video signal recording instruction, the area designating circuit 26 is forced to designate the area CH1. Then, a gate circuit 27 is caused to operate according to the PG signal. A video signal coming through a terminal 38 is processed into a signal form suited for recording through a video signal processing circuit 39. The processed video signal is supplied to an adder 40. The adder 40 adds the pilot signals obtained from the pilot signal generating circuit 32 to the video signal. The output of the adder 40 is supplied via a gate circuit 27 to the heads 3 and 4 to be recorded in the applicable parts of the areas CH2 to CH6. In this instance, the PCM audio signal is recorded in exactly the same manner as in the case of the recording operation described in the foregoing.

At the time of reproduction, video signals picked up by the heads 3 and 4 are made into one continuous signal through the gate circuit 27. The continuous signal is supplied to the video signal processing circuit 39 to be brought back into the original signal form. The output of the processing circuit 39 is produced from a terminal 41. Further, the continuous signal produced from the gate circuit 27 is also supplied to the LPF 35 via a terminal V of the switch 34.

The LPF 35 continuously separates pilot signal components, which are then supplied to the ATF circuit 37. In this instance, a tracking error signal obtained from the ATF circuit 37 does not have to be sampled and held. The tracking error signal is thus supplied to the capstan motor control circuit 20 as it is. Further, in this instance, a PCM audio signal is also reproduced from the area CH1 to give a reproduced analog audio signal from a terminal 36. However, tracking control using the output of the gate circuit 28 is not performed.

The head search control circuit 51 produces an output signal which becomes at a high level in a silent period where and input audio signal becomes at a level lower than a predetermined value.

Figure 5:
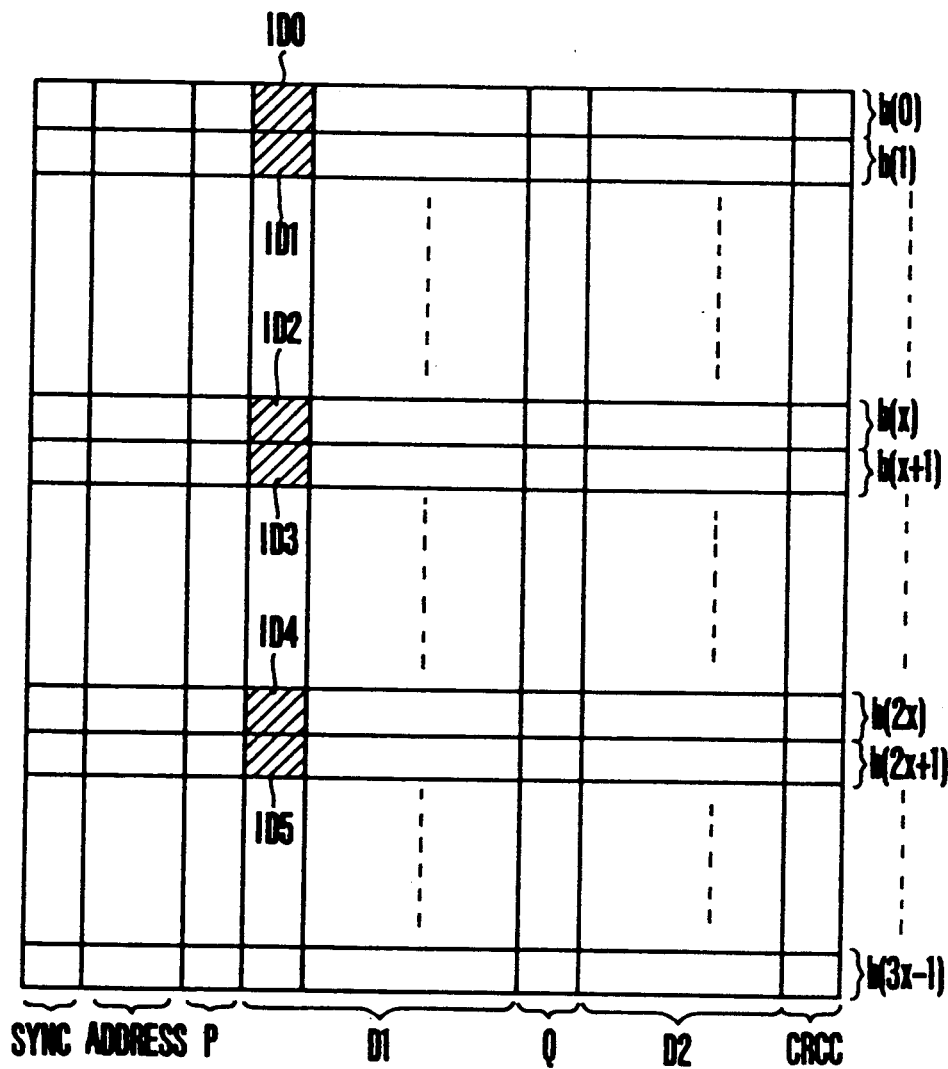
FIG. 5 is an illustration of a data matrix showing the format of data recorded by the tape recorder arranged according to this invention as shown in FIG. 4.

An example of data recording formats applicable to this embodiment is as follows: FIG. 5 shows the details of the format in which data are to be recorded in one track within each of the areas shown in FIG. 2. In other words, the illustrated data format includes a PCM audio data corresponding to a 1/60 sec. portion of an audio signal. In the data matrix of FIG. 5, a column SYNC represents a synchronizing data train; a column ADDRESS an address data train; columns P and Q redundant data trains for error correction; a column CRCC a known CRCC check code data train; and columns D1 and D2 data trains containing audio signal information respectively. Meanwhile, rows b(0) to b(3X−1) represents the lines of the data matrix. In each of the rows, data are recorded one after another from left to right to form one data block. For example, in the row b(0), a data of the column SYNC is followed by a data of the column ADDRESS, further by a data of the column P and so forth one after another. Further, next to the last data in the row b(X) is recorded a data of the column SYNC in the row b(X+1). Data recording for one track comes to an end when a data of the last column in the last row b(3X−1) is recorded.

In the first column among a group of columns D1, six data ID0 to ID5 in the rows b(0), b(1), b(X), b(X+1), b(2X) and b(2X+1) are arranged not to include any information on the audio signal. In other words, this part is reserved for recording a head searching data. In this specific embodiment, an 8-bit data indicated by a reference symbol ID0 in FIG. 5 is arranged to be the head searching data. Further, another 8-bit data ID1, is arranged to have a specific one of its bits recorded as "1" for a track corresponding to the above-stated period T3 and as "0" for all other tracks. In this instance, the data ID0 and the ID1 are handled in a pair. Therefore, they are preferably recorded close to each other. The data matrix is arranged with this taken into consideration.

Figure 6:
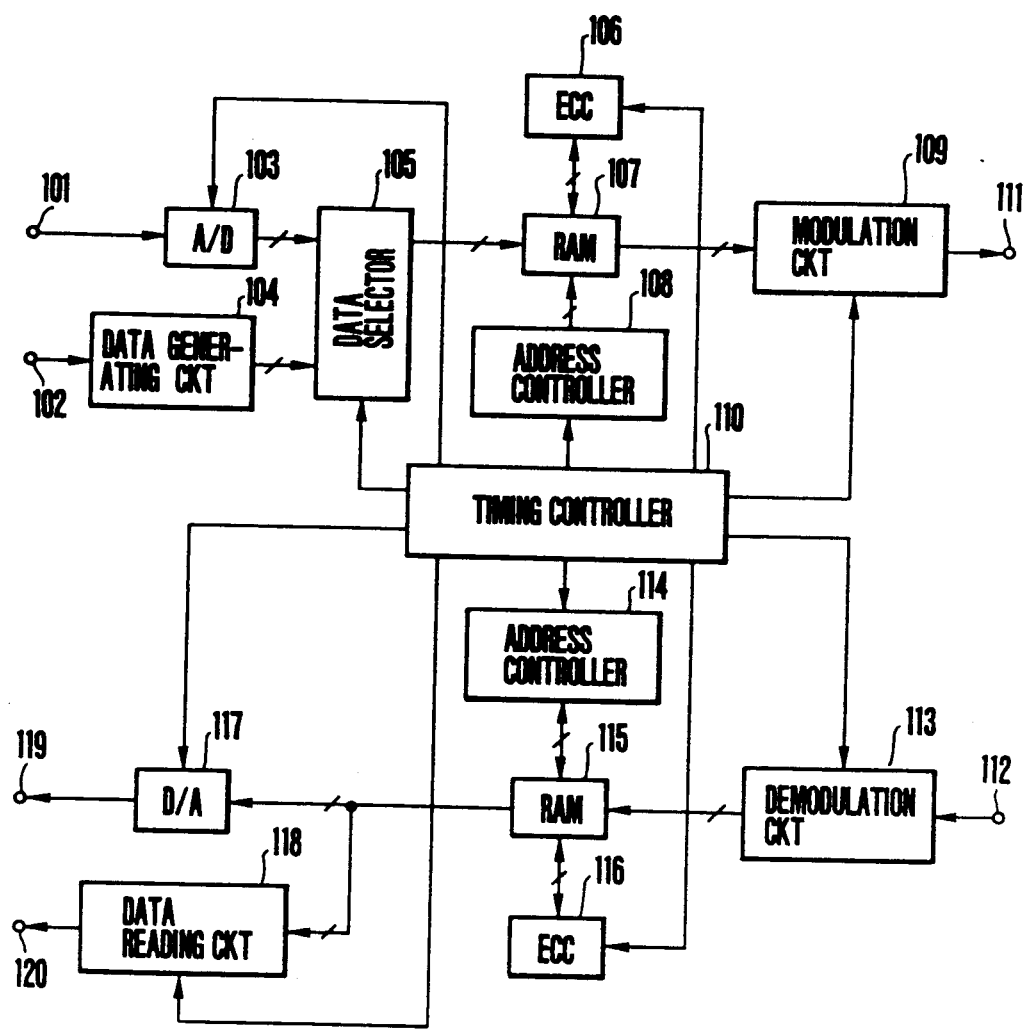
FIGS. 6(a)-6(e), are diagrams showing by way of example a PCM audio signal processing circuit which is included in the same embodiment shown in FIG. 4.

The recording and reproducing operations on the head searching data of the embodiment are as follows: FIG. 6 shows by way of example the details of the PCM audio signal processing circuit 30 included in FIG. 4. Referring to FIG. 6, a terminal 101 is arranged to receive an incoming analog audio signal which is supplied to the terminal 29. Another terminal 102 is arranged to receive the output of the head search control circuit 51. When a high level signal is supplied to the terminal 102, a data generating circuit 104 produces a data which causes a specific bit of the data corresponding to the above-stated data ID1 to become "1". If the signal received by the terminal 102 is at a low level, the data generating circuit 104 produces a data which causes the above-stated specific bit of the data ID1 to become "0".

Meanwhile, the analog audio signal received by the terminal 101 is supplied to an analog-to-digital converter 103 (hereinafter referred to as A/D converter). The A/D converter 103 samples the analog audio signal at a predetermined frequency and quantizes it. Then, the quantized output of the A/D converter 103 is supplied to a data selector 105 at a predetermined timing. The data selector 105 is arranged to supply a RAM (random access memory) 107 with the output of the data generating circuit 104 at a timing which comes to correspond with the data ID1 once within a one-field period. The data selector 105 supplies the RAM 107 with the output of the A/D converter 103 at another timing. At the RAM 107, a parity word (P,Q), CRCC, etc. obtained from an error correction circuit 106 (hereinafter referred to as ECC), address data, etc. obtained from an address controller 108 and the data obtained from the above-stated data selector 105 are arranged into a data matrix as shown in FIG. 5. The RAM 107 supplies a modulation circuit 109 with a data which is time-base compressed in the above-stated sequence. The modulation circuit 109 performs a digital modulating operation such as BPM (by-phase modulation) or the like on the data received. The modulation output of the circuit 109 is produced via a terminal 111. A digital modulated audio signal which is thus produced from the terminal 111 is supplied to the adder 33 mentioned in the foregoing.

At the time of reproduction, the embodiment operates as follows: A terminal 112 of the PCM audio signal processing circuit 30 receives the digital modulated signal from the gate circuit 28. The digital modulated signal is then demodulated by a digital demodulation circuit 113. The demodulated signal thus obtained is supplied to a RAM 115. The RAM 115 performs a signal processing operation in a manner completely converse to the operation of the other RAM 107. The arrangement of data are changed on the basis of address data obtained from an address controller 114 and also on the basis of synchronizing data. Then, errors are corrected by an ECC 116 (error correction circuit). As a result of this, the data of the columns D1 and D2 are produced from the RAM 115 to be supplied to a digital-to-analog (D/A) converter 117 and a data reading circuit 118.

At the D/A converter 117, the input is restored into the original analog audio signal. The restored analog audio signal is produced via a terminal 119 from the terminal 36 which is shown in FIG. 4. The data reading circuit 118 meanwhile picks up the data ID1. In the event that the specific bit of the data ID1 is at "1", the circuit 118 supplies a pulse signal via a terminal 120 to the head search detection circuit 52 at intervals of 1/60 sec. Further, in the signal processing circuit 30 shown in FIG. 6, the operations of all the parts of the circuit 30 are synchronized with a timing signal produced from a timing controller 110.

A head searching operation using the signal obtained from the data reading circuit 118 of FIG. 6 is as follows: FIG. 7 shows an example of arrangement of the head search detection circuit 52 of FIG. 4. Referring to FIG. 7, the output of the data reading circuit 118 is supplied to a terminal 122.

The heads 3 and 4 pass across a head search designated area at intervals of 1/60 sec. even with the tape allowed to travel at a high speed. Therefore, when they come to a part corresponding to the period of time T3 mentioned in the foregoing, the data ID1 is obtainable only once in 1/60 sec. Further, in this instance, the heads 3 and 4 perform azimuth overwriting. Therefore, the above-stated period is set to be sufficiently long compared with the recording track pitch. In other words, the data can be picked up by these heads even when they are out of the tracking control. Further, since the heads 3 and 4 are arranged to obliquely cross the recording tracks, the signals reproduced by them do not become a continuous wave. However, the reproduced signal includes a number 3X of synchronizing data. Therefore, the data ID1 can be extracted by using synchronizing data.

Again referring to FIG. 7, the PG signal mentioned in the foregoing is supplied to a terminal 121. In synchronism with the PG signal, a one-shot multivibrator 123 forms a pulse at every 1/60 sec. and supplies it to AND gates 125 and 127. Meanwhile, when a pulse signal is supplied to another terminal 122, it triggers a retriggerable monostable multivibrator 124. In case that this pulse signal consists of pulses supplied at every 1/60 sec., the output of the retriggerable monostable multivibrator 124 remains at a high level during this period. Assuming that the above-stated period of time T3 is set at a length of time long enough for enabling the head to trace at least four times (4n/60 sec.), four pulses are obtained from the AND gate 125 during a period corresponding to this period T3. Further, pulses are obtained from another AND gate 127 during a period other than the period corresponding to the period T3.

With the four pulses consecutively obtained from the AND gate 125, a counter supplies the Q output thereof to a counter 131 at a high level. The output pulse of the AND gate 127 resets the counter 128 via an OR gate 129. The counter 128 stays in the reset state for a while (several seconds for example) after the level of the Q output of the counter 128 becomes high. This arrangement effectively precludes any possible mistaking of a silent part or miscounting due to a long silent part. A data DA is designating a specific tune among others for which a head search operation is to be performed. When the data produced from a counter 131 comes to coincide with the data DA, a comparison circuit 132 produced a high level output. The high level output triggers a monostable multivibrator 133. The output of this monostable multivibrator 133 is supplied via a terminal 134 to the capstan motor control circuit 20 of FIG. 4. In response to this, the capstan motor control circuit 20 operates to bring the travel of the tape to a stop.

With the tape recorder arranged according to this invention as described in the foregoing, a searching or discriminating operation on audio signals recorded by a digital recording audio tape recorder can be accomplished without recourse to a manual operation otherwise to be performed by the operator.

In the specific embodiment described, a head search data is arranged to be separately recorded. However, it is also possible to use some of the data corresponding to the audio signal for attaining the same purpose. In cases where the width of the head does not much differ from the recording track pitch, the period of time T3 may be set to be long relative to the tape travelling speed to be employed for the head search operation in such a manner that a silent part or a mute part is detectable only once in a number of detecting operations.

Figure 8:
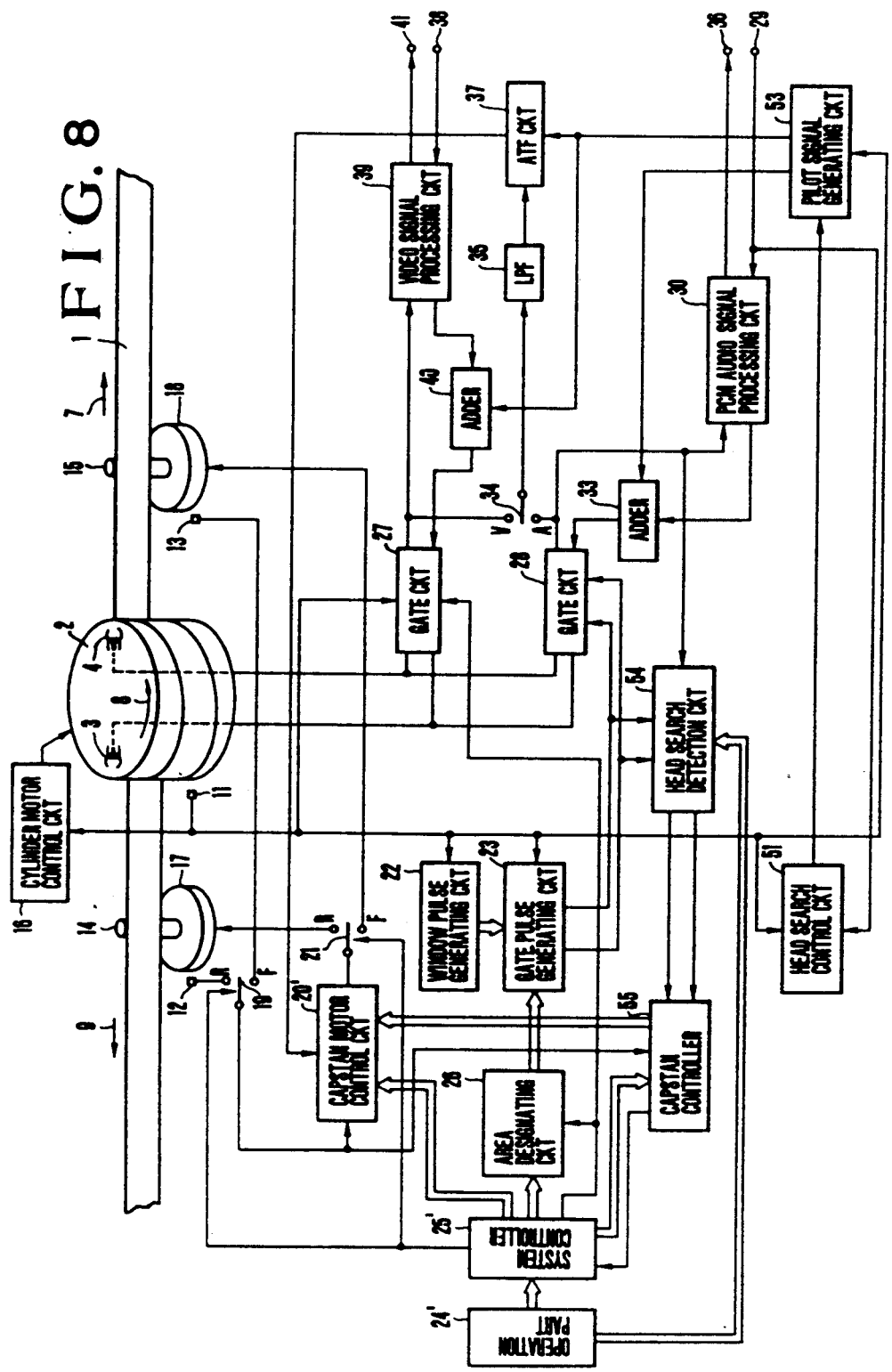
FIG. 8 is a diagram showing the outline of a tape recorder arranged according to this invention as another embodiment thereof.
Figure 9:
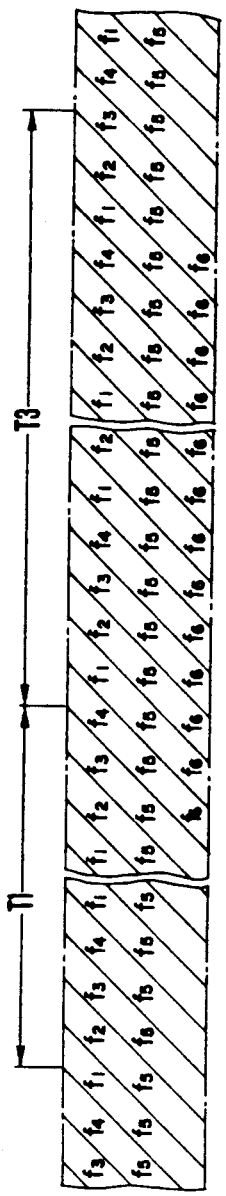
FIG. 9 is an illustration of a recorded state of pilot signals recorded in the head searching or leader part of a recording tape.
Figure 10:
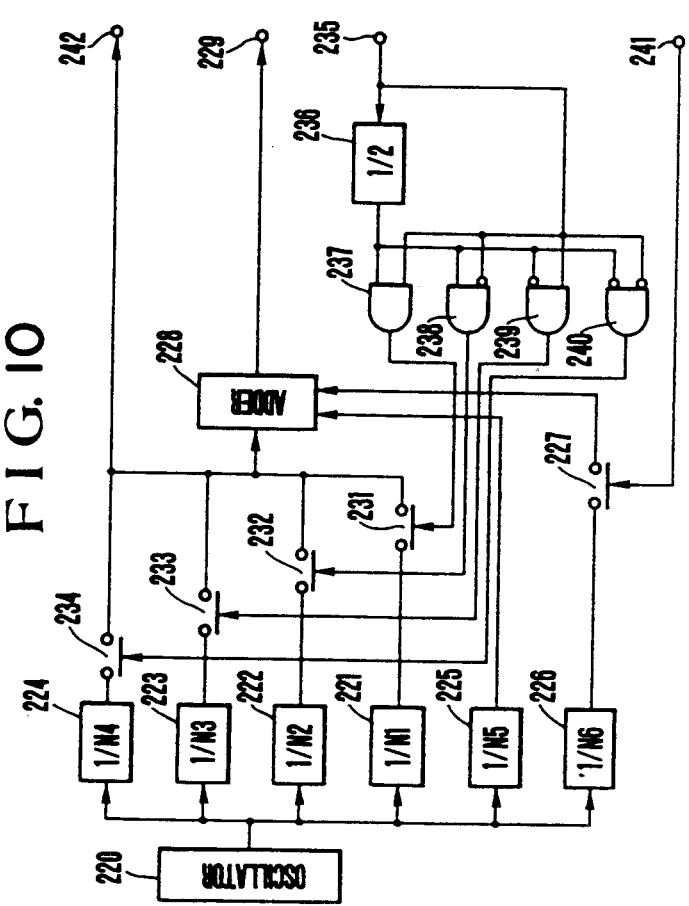
FIG. 10 is a circuit diagram showing by way of example the arrangement of a pilot signal generating circuit which is included in FIG. 8.

FIG. 8 shows in outline the arrangement of a tape recorder arranged according to this invention as another embodiment thereof. The component elements which are similar to those of the preceding embodiment shown in FIG. 4 are indicated by the same reference numerals, or by primed reference numerals, and the details of them are omitted from the following description. The head searching function of this embodiment is arranged to be performed in the following manner. FIG. 9 is an illustration of a recorded state of a leader or head search part of a record on the tape. FIG. 10 is a circuit diagram showing by way of example the arrangement of a pilot signal generating circuit 53 included in the embodiment shown in FIG. 8.

Referring to FIG. 10, the circuit 53 includes an oscillator 220, which produces a standard frequency signal. This frequency signal is supplied to frequency dividers 221 to 226 of different frequency dividing ratios. The frequency dividers 221, 222, 223 and 224 which have frequency dividing ratios 1/N1, 1/N2, 1/N3 and 1/N4 are arranged to respectively produce tracking control pilot signals (hereinafter referred to as TPS's) of different frequency values f1, f2, f3 and f4. The frequency dividers 225 and 226 are arranged to produce a record detecting pilot signal (hereinafter referred to as MTS) of a frequency value f5 and a head search pilot signal (hereinafter referred to as BDS) of a frequency value f6. A terminal 235 is arranged to receive the PG signal.

The PG signal frequency is divided by a ½ frequency divider 236. With the PG signal thus frequency divided, logic gates 237, 238, 239 and 240 produce high level outputs one after another at every one-field period. This causes analog switches 231, 232, 233 and 234 to turn on one after another at every one-field period. As a result, the TPS's are supplied to an adder 228 in rotation in the sequence of their frequency values f1→f2→f3→f4. Meanwhile, a terminal 241 is arranged to receive the output of the above-stated head search control circuit 51. When the input to the terminal 241 is at a high level, a switch 227 supplies the pilot signals of frequency values f5 and f6 to the adder 228. Except that occasion, the switch 227 supplies the adder 228 only with the pilot signal of the frequency value f5. The adder 228 performs an adding operation on the pilot signals received. The output of the adder 228 is supplied via a terminal 229 to another adder 33. Meanwhile, the TPS's (tracking control pilot signals) are supplied via another terminal 242 also to the adder 40 and the ATF circuit 37.

The following describes the details of the pilot signals: The TPS's have, as well known, the different frequency values. Let us assume that the oscillation frequency of the oscillator 220 is 378 fH and that N1=58, N2=50, N3=36 and N4=40; and f1≈6.5 fH, f2≈7.5 fH, f3≈10.5 fH and f4≈9.5 fH.

However, the arrangement of this embodiment differs from the arrangement of the conventional video tape recorder in the following point: For the purpose of obtaining a tracking error signal by sample-and-holding, the recording level is increased by 3 dB or thereabout over the level at which the TPS's are recorded in recording a video signal. This arrangement is possible because the recording level can be raised without paying any heed to interference with a chroma signal which tends to occur in the case of a video tape recorder. For example, assuming that the recording level of the TPS's superimposed on a video signal is arranged to be lower by about 14 dB than the recording level of a chroma signal, the recording level of the TPS's is set at a level lower than the chroma signal recording level by about 11 dB in case that the tape recorder is to be used exclusively for audio signal recording.

Next, the frequency values f5 and f6 and the recording level of the pilot signals of these frequency values are arranged as follows: According to the basic concept, the frequency and recording level should be determined to be not affected by the azimuth angle, to have no adverse effect on the TPS's and not to increase the error rate of the PCM audio signal. It has been ascertained that frequency not exceeding 500 KHz or thereabout brings about no problem in terms of the influence of the azimuth angle and the increase of the error rate. With regard to the recording level, it is also ascertained that arrangement to set the recording level in a manner similar to the TPS's brings about no adverse effect on the PCM audio signal. More specifically, since it is preferable for circuit arrangement to obtain the frequency values f5 and f6 by frequency dividing one and the same frequency of 378 fH in the ratio of an integral multiple, these frequency values are set, for example, at f5=14.5 fH and f6=16.5 fH. Further, the values N5 and N6 are respectively set at N5=26 and N6=23. As well known, the tracking control by means of the TPS's is performed by comparing fH and 3 fH components with each other, the frequency value f5 is arranged to be a frequency higher than f3 by 4 fH and the other frequency value f6 to be a frequency still higher by 2 fH.

In this instance, the actual values of f5 and f6 become: f5≈218 KHz and f6≈259 KHz, which give a sufficiently wide margin relative to 500 KHz.

Referring to FIG. 9, time parts T1 and T3 are indicated. Reference symbols f1 to f4 respectively denote the frequency values of the tracking control pilot signals (TPS's); f5 that of the record detecting pilot signal (MTS) which is recorded in every part where the PCM audio signal is recorded; and f6 that of the head searching pilot signal (BDS).

Figure 11:
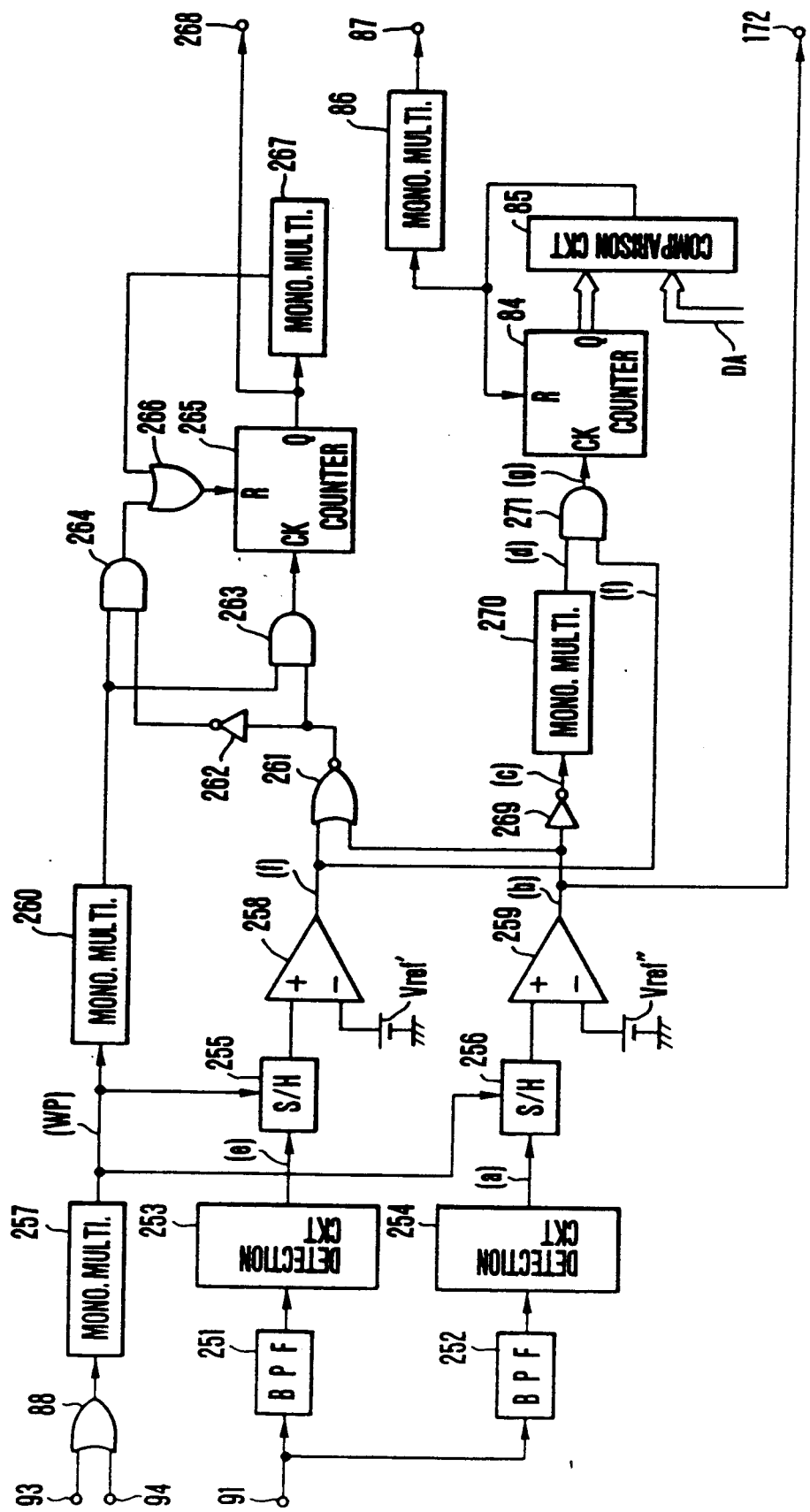
FIG. 11 is a circuit diagram showing by way of example the arrangement of a head search detection circuit included in the embodiment shown in FIG. 8.
Figure 12:
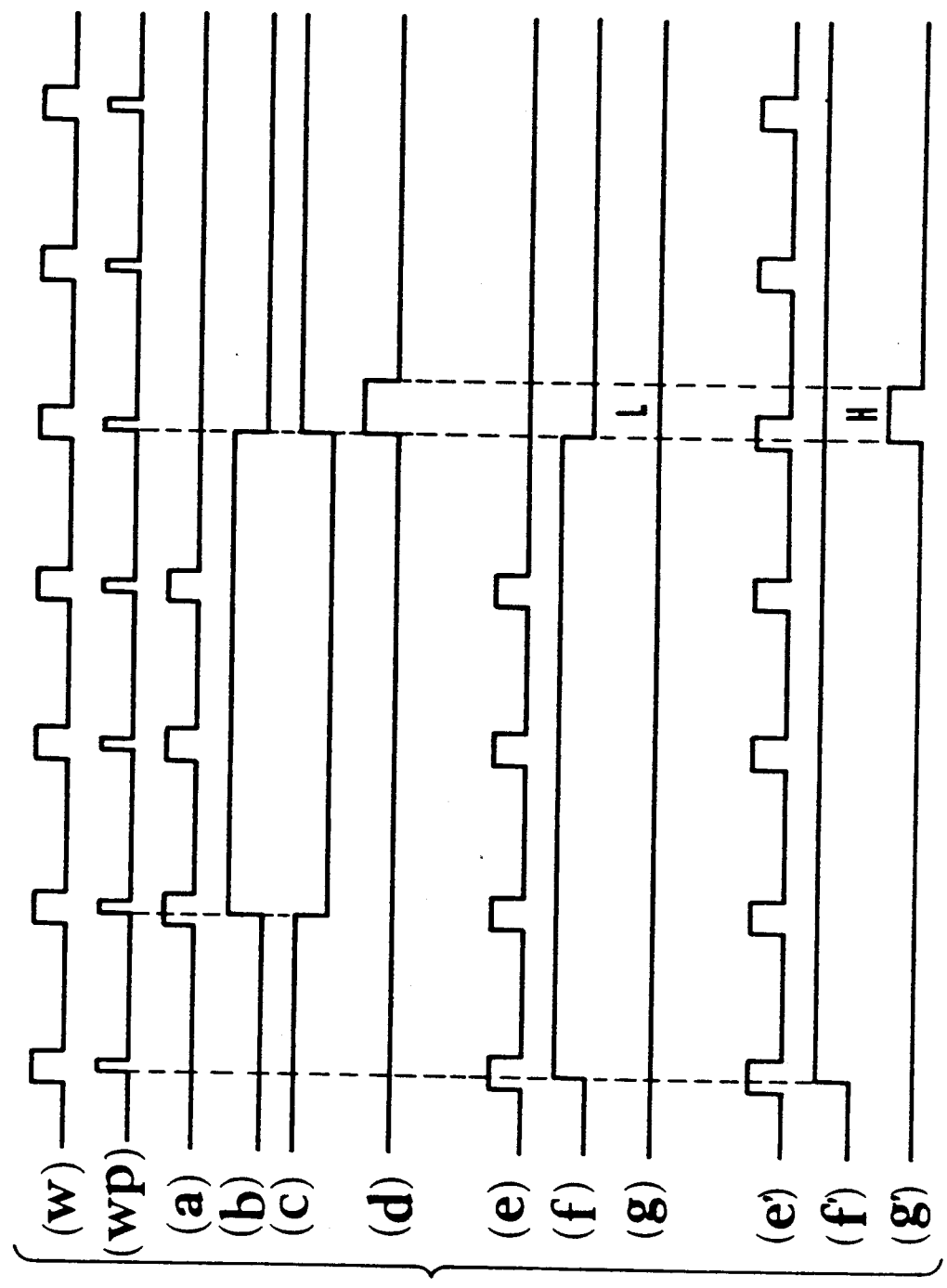
FIG. 12 is a timing chart showing the operations of the various parts of FIG. 11.

The head and blank search operation of the embodiment is as follows: FIG. 11 shows by way of example the details of arrangement of the head search detection circuit 54 shown in FIG. 8. FIG. 12 is a timing chart showing the wave forms of signals produced from the various parts of FIG. 11. The search operation will be described with reference to these drawings. The reproduced signal coming from the gate circuit 28 is supplied via a terminal 91 to BPF's 251 and 252. The BPF's separate respectively the frequency components of frequency values f5 and f6 from the reproduced signal. The outputs of the BPF's 251 and 252 are supplied to detection circuits 253 and 254 for level detection. The outputs of the circuits 253 and 254 are supplied to sample-and-hold circuits 255 and 256 (hereinafter referred to as S/H's). The frequency values f5 and f6 are arranged to be sufficiently low to be not affected by the azimuth recording. A monostable multivibrator 257 is arranged to be triggered by the rise of the OR of gate pulses for the heads 3 and 4. The fall of the OR coincides with the timing at which the head traces the center of each area of the tape. S/H circuits 255 and 256 operate according to this timing. The outputs of the S/H circuits are supplied to a comparison circuits 258 and 259 to be compared with reference levels Vref' and Vref''. The comparison circuits 258 and 259 produce high level outputs in the event of presence of the pilot signals of the frequency values f5 and f6. A monostable multivibrator 260 is arranged to produce a pulse immediately after a sampling operation.

The output (b) of the comparison circuit 259 is inverted by an inverter 269. A monostable multivibrator 270 is triggered by the rise of the level of the output (c) of the inverter 269. The monostable multivibrator 270 is thus arranged to produce an output (d) which remains at a high level for a predetermined period of time. If the output (f) of the comparator 258 is at a high level during this period, the level of the output (g) of an AND gate 271 remains high while the level of the output (d) of the monostable multivibrator 270 is high. Further, if the level of the output (f) of the comparator 258 is low during the above-stated period, the output (g) of the AND gate 271 remains low. The reason for this arrangement is as follows:

Generally, when a tune is recorded by the operator, there arise silent parts at the beginning and the end of the tune. In that instance, if the parts of the tape remain unrecorded in front and in rear of this recorded tune, the recorded part and the silent part might be mistaken for two recorded parts. Then, this presents a problem in performing a several-tune-skipping head search operation which will be described later. To solve this problem, detection of the pilot signal of the frequency value f6 which corresponds to the silent part in the rear of the recorded tune is arranged to be nullified to always detect the head part of the recorded tune.

The circuit arrangement is provided with a counter 84 for the above-stated several-tune-skipping head search operation. Every time a leader part of a recorded tune is detected, the counter 84 counts the pulse output (g) of the AND gate 271. Meanwhile, a data DA relative to the location of desired one of the leader parts of recorded tunes is supplied from the operation part 24 also to the counter 84. When the counted data of the counter 84 comes to coincide with this data DA, a comparison circuit 85 produces a tape stopping instruction pulse, which informs, via a monostable multivibrator 86 and a terminal 87, a capstan controller 55 that the leader of a desired recorded tune is located.

Assuming that the heads 3 and 4 come to a portion of a designated area having no PCM audio signal recorded there, the outputs of the comparison circuits 258 and 259 are at a low level. Then, the output level of a NOR gate 261 becomes high. With the output level of the NOR gate 261 having become high, an AND gate 263 supplies a counter 265 with pulses produced from the monostable multivibrator 260. When a predetermined number of the pulses are consecutively counted by the counter 265, the counter 265 produces the Q output thereof at a high level. The high level Q output is supplied via a terminal 268 to the capstan controller 55 to bring the travel of the tape to a stop.

An inverter 262 and an AND gate 264 are so arranged as to enable the counter 265 to produce a high level output only when detection is consecutively made. In other words, to prevent erroneous detection, the inverter 262 and the AND gate 264 are arranged to reset the counter 265 when either the pilot signal of frequency f5 or the pilot signal of frequency f6 is reproduced. Further, a monostable multivibrator 267 and an OR gate 266 are arranged to keep the counter 265 in an inoperative state for a while after detection.

Figure 13:
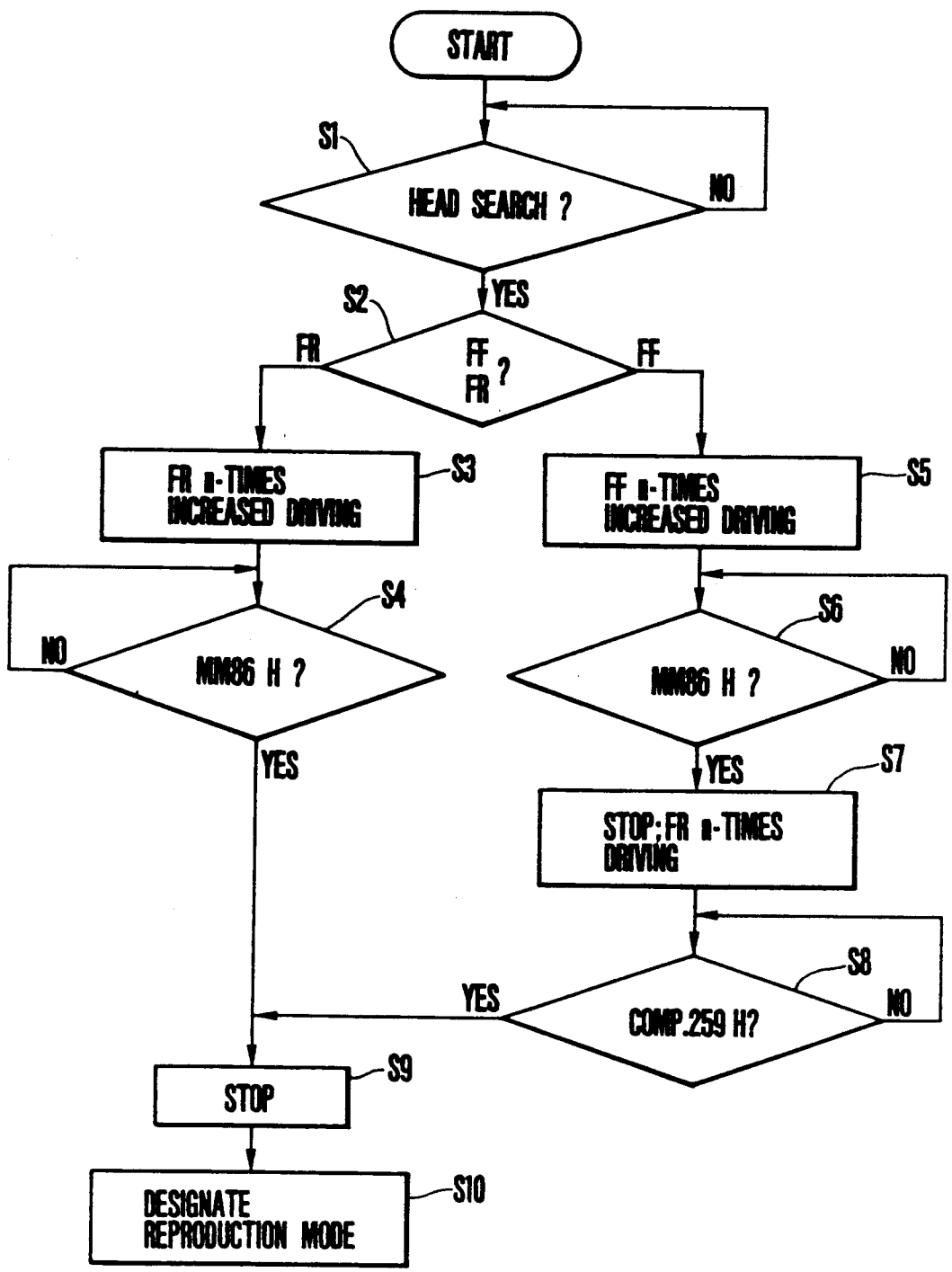
FIG. 13 is a flow chart showing by way of example the operation of a capstan controller which is included in the embodiment shown in FIG. 8.

The capstan controller 55 which is shown in FIG. 8 operates as follows: FIG. 13 is a flow chart showing by way of example the operation of the capstan controller 55. FIGS. 14(a) to 14(f) show the control operation of the embodiment on the travel of the record bearing medium or tape. FIG. 15 is a flow chart showing another example of the capstan controller 55.

Referring first to FIG. 13, a head search instruction is assumed to be given from the operation part 24' at a step S1. Then, the capstan motor control circuit 20' is controlled as follows: In case that this instruction is for a fast feeding (FF) head search operation, the tape 1 is allowed at a step S5 to travel at a speed "n" times as fast as a speed employed in recording. If the instruction is for a fast rewinding (FR) head search operation, the tape 1 is rewound at a step S3 at a speed "n" times as fast as the recording speed. In this instance, an area is of course designated by the system controller 25'. The gate pulse generating circuit 23 is producing gate pulses to operate thereby the gate circuit 28. During the rewinding head search operation, when a high level output is produced from the monostable multivibrator 86 of FIG. 11 at a step S4, a part corresponding to the above-stated DA-th period T3 is detected and the tape 1 comes to a stop at a step S9. Then, the capstan motor control circuit 20' and the system controller 25' further operate to cause a reproducing operation to begin.

Figure 14:
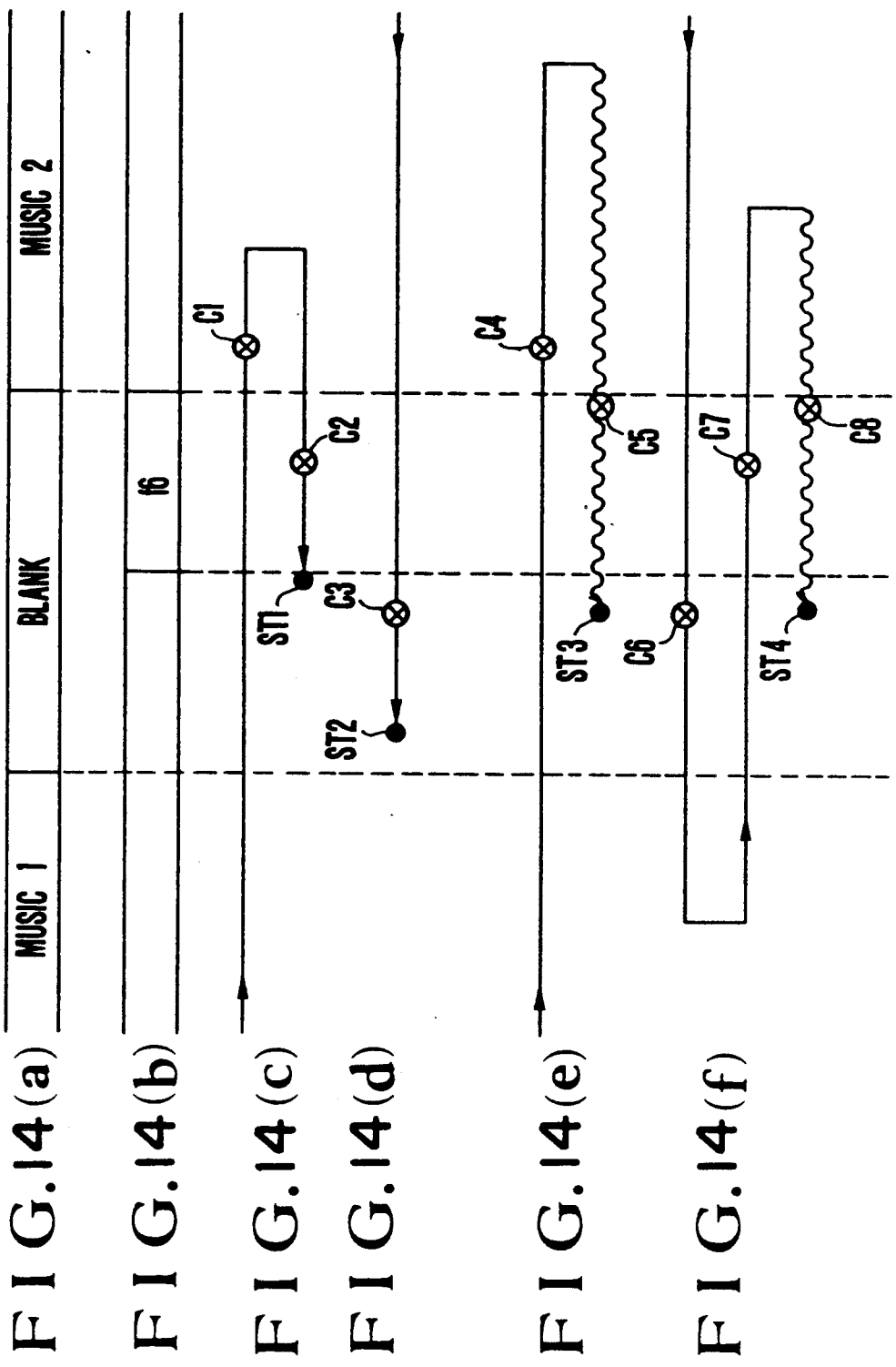
FIGS. 14(a) to 14(g) show in a chart the tape travel control operation of the capstan controller shown in FIG. 8.
Figure 15:
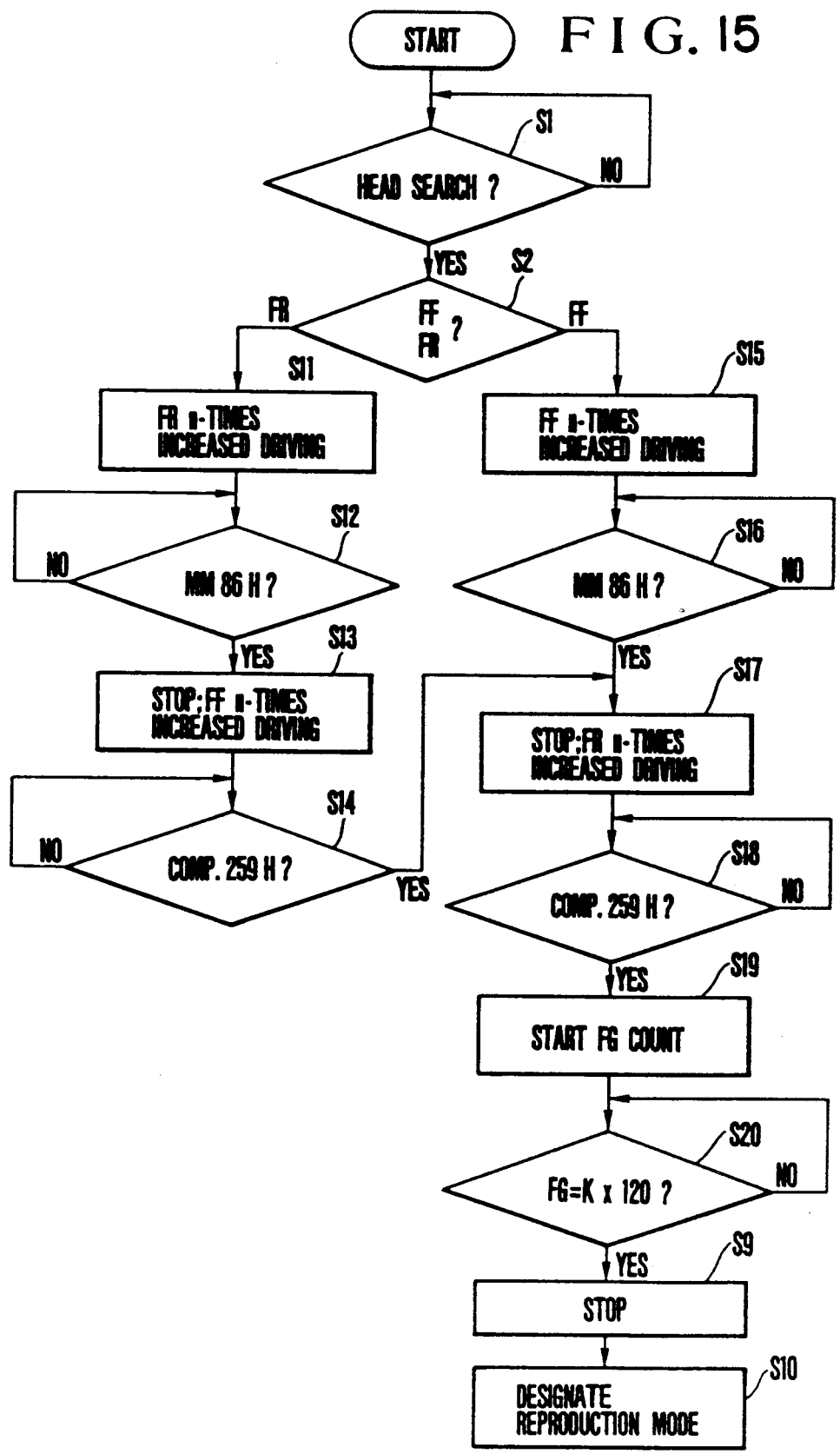
FIG. 15 is a flow chart showing another example of the operation of the capstan controller which is included in the embodiment shown in FIG. 8.

This operation is as shown in FIG. 14(d). There is a silent part or a blank part BLANK between a tune MUSICI and another tune MUSIC2. As mentioned in the foregoing, the pilot signal of the frequency f6 is recorded in the silent or blank part. However, the output of the monostable multivibrator 86 is actually produced when the pilot signal of frequency f5 is detected after the pilot signal of frequency f6 ceases to be detected. Thus, the output of the monostable multivibrator 86 is produced at a point of time C3 as indicated in FIG. 14(d). When a tape stopping instruction is given at the point of time C3, the inertia of the tape prevents the tape from coming to a stop until the heads 3 and 4 come to a tracing position ST2 as indicated in FIG. 14(d).

In the event that a high level output is produced from the monostable multivibrator 86 during the process of a fast feeding head search operation at a step 6, the tape is temporarily brought to a stop. The tape 1 then begins to be rewound, that is, it is caused to travel in the reverse direction at a step S7. Following this when the output level of the comparator 259 of FIG. 11 becomes high at a step S8, the tape 1 is brought to a stop and reproduction begins. This operation is as shown in FIG. 14(c). The output level of the monostable multivibrator 86 becomes high at a point of time C1. After the tape comes to a stop beyond this point C1 due to the inertia thereof, rewinding is performed at a speed "n" times as fast as the recording speed. Then, the output level of the comparison circuit or comparator 259 becomes high at a point of time C2. By this, a tape stopping instruction is given to bring the tape 1 actually to a stop at a point ST1. The influence of the inertia is preferably arranged to be limited to an extent less than one half of the period of time T1. Because, if the value of "n" is too large, there arises the possibility that the rear end of the tune MUSIC1 is reproduced when reproduction begins from the stopped position of the tape for the other tune MUSIC2. For example, assuming that the period of time T1 is 2 sec. which corresponds to a 120 track portion of the tape and the period of time T2 is 1 sec. corresponding to a 60 track portion of the tape, the value of "n" may be determined in such a manner as to make the extent of the influence of the inertia to be approximately the 60 track portion of the tape. Such arrangement ensures satisfactory reproduction with the tape 1 always brought to a stop at a point where the reproduction can be made from a silent or blank part.

Referring now to the flow chart of FIG. 15, another example of operation is as follows: In this case, the tape 1 can be allowed to travel at a still faster speed for a fast feeding head search operation or for a rewinding head search operation.

During the process of the fast head search operation at a step S15, when the output of the monostable multivibrator 86 is detected in the same manner as in the case of FIG. 13, at a step S16, the tape 1 is brought to a stop. Then, as shown in FIG. 14(e), this stopping point is located considerably deep inside the recorded tune MUSIC2. Following this, the tape is caused to travel in the rewinding direction at a speed which is "m" times as fast as the recording speed. Compared with the other value "n", this value "m" is set at a much smaller value. For example, the value "m" is set at 5 while the value "n" is 60. Assuming that the pilot signal of the frequency f6 can be detected X times during the period of time T3 with the tape 1 allowed to travel at the "n" times faster speed, the pilot signal is detectable nX/m times during the period T3 with the tape 1 allowed to travel at the "m" times faster speed. In this case, therefore, the rise and fall of the signal level can be fairly accurately detected during the above-stated period of time T3.

With the output level of the comparison circuit 259 detected to have become high at the point of time C5 as shown in FIG. 14(e), the pulses of the FG signal representing the rotation of the capstan 14 begin to be counted at a step S19. When the counted number of the pulses of the FG signal reaches a predetermined number at a step S20, the tape 1 is brought to a stop. The predetermined counted number of pulses of the FG signal is set, for example, at a value corresponding to 120 tracks. Then, assuming that a "k" number of pulses of the FG signal are to be generated while the tape 1 travels to an extent corresponding to one track, arrangement to bring the tape 1 to a stop when 120×"k" pulses of the FG signal have been counted gives a good stopping position of the tape, as indicated by a point ST3 in FIG. 14(e). This is on the assumption that the period of time T1 approximately corresponds to 120 tracks and the period of time T3 to 60 tracks.

In the event of a rewinding head search operation, when the output level of the monostable multivibrator 86 becomes high at a step S12, the travelling direction of the tape is reversed. The tape is then caused to travel at a speed "n" times as fast as the recording speed in the reverse direction at a step S13. After that, when the output level of the comparison circuit 259 becomes high, the tape is brought to a stop. Following this, the tape is caused to travel at a speed "m" times as fast as the recording speed further in the reverse direction at a step S17. The ensuing steps of operation are similar to those of the fast feeding head search operation.

In the tape stopping operation according to the flow chart of FIG. 15, the search speed is lowered before bringing the tape to a step. This arrangement enhances the accuracy of detection of a silent or blank part and brings the tape to a stop in a suitable position without fail.

The tape recorder arranged as described above is capable of automatically and reliably detecting a silent or blank period. In accordance with this invention, therefore, a tape recorder which is easy to operate and permits long recording with high quality can be obtained.

Figure 16:
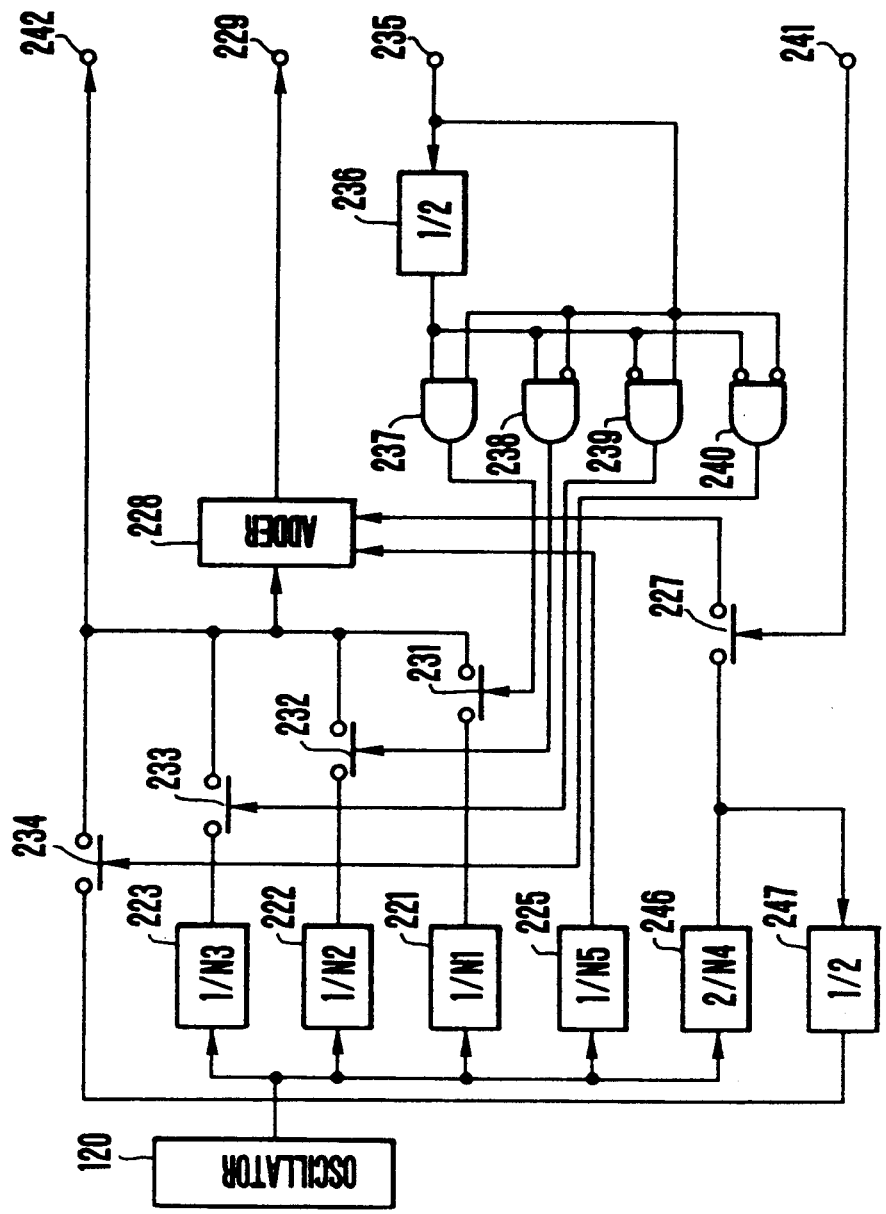
FIGS. 16(a)-16(f) are circuit diagrams showing another example of a pilot signal generating circuit included in the embodiment shown in FIG. 8.

FIG. 16 shows another example of arrangement of the pilot signal generating circuit 53 shown in FIG. 8. The circuit 53 in this instance is provided with a 2/N4 frequency divider 246 and a ½ frequency divider 247. With the exception of that, the arrangement of FIG. 16 is similar to the preceding example shown in FIG. 10. In the case of FIG. 16, the frequency f6 is arranged to be 2f4. Assuming that the frequency value of f4 is 9.5 fH, the value f6 becomes: $f6 = 19\ fH \approx 297$ KHz. If the value N4 is an even number, the arrangement of this example obviates the necessity of providing a frequency divider of an especially large size for BDS (head search pilot signal).

In this specification, digital modulation recording (PCM) is alone taken up. However, this invention is applicable also to an audio signal recording apparatus of the kind performing analog frequency modulation recording and the same advantageous effect of the invention is attainable by that application.

In the foregoing description, the pilot signal of frequency f6 is arranged to be recorded as the head searching pilot signal. However, this arrangement may be replaced with an arrangement in which a head search data is added to the data of the audio signal. In that event, to facilitate the search operation, the data is preferably recorded close to the digital synchronizing data.

What is claimed is:

1. An audio signal recording apparatus, comprising:
   (a) detecting means for detecting a silent part of an incoming audio signal within said audio signal corresponding to less than a threshold volume and generating a detection signal;
   (b) means for generating a reference signal of a predetermined frequency;
   (c) modulating means for modulating said incoming audio signal to produce a modulated audio signal;
   (d) superimposing means for superimposing said reference signal on said modulated audio signal in response to said detection signal to produce a recording signal; and
   (e) recording means for recording said recording signal on a record bearing medium.

2. An apparatus according to claim 1, wherein the frequency of said reference signal is set at a value lower than the frequency band of said modulated audio signal.

3. An apparatus according to claim 2, wherein said record bearing medium is in a tape shape having a plurality of parallel areas longitudinally extending along said tape shape; and said recording means includes at least one rotary head and is arranged to perform recording by obliquely forming recording tracks one after another in one of said plurality of areas on said record bearing medium.

4. An apparatus according to claim 3, further comprising second superimposing means for superimposing upon said modulated audio signal first, second, third and fourth pilot signals of four different frequency values one after another in rotation.

5. An apparatus according to claim 4, wherein the frquency of said reference signal differs from any of the four different frequency values of said pilot signals.

6. An apparatus according to claim 5, further comprising third superimposing means for superimposing upon said modulated audio signal a fifth pilot signal, wherein the frequency of said fifth pilot signal differs from any of the four different frequency values of said first, second, third and fourth pilot signals.

7. An apparatus according to claim 6, wherein the frequency of said reference signal differs from frequency of said fifth pilot signal.

8. An audio signal recording apparatus, comprising:
   (a) detecting means for detecting a silent part of an incoming audio signal within said audio signal corresponding to less than a threshold volume and generating a detection signal;
   (b) first means for generating first, second, third and fourth pilot signals of four different frequency values one after another in rotation;
   (c) second means for generating a reference signal in response to to said detection signal, the frequency of said reference signal being different from four frequency values of said pilot signals;
   (d) modulating means for modulating said incoming audio signal to produce a modulated audio signal;
   (e) superimposing means for superimposing said first, second, third and fourth pilot signals, said reference signal and said modulated audio signal to produce a recording signal; and
   (f) recording means for recording said recording signal on a record bearing medium.

* * * * *